(12) United States Patent
Steel et al.

(10) Patent No.: US 12,527,915 B2
(45) Date of Patent: Jan. 20, 2026

(54) INJECTION DEVICE

(71) Applicant: SHL MEDICAL AG, Zug (CH)

(72) Inventors: Donald William Steel, London (GB);
Elliot Henry Porter, London (GB);
Adam Jonathan Frederick Stops,
Leicester (GB)

(73) Assignee: SHL Medical AG, Zug (CH)

( * ) Notice: Subject to any disclaimer, the term of this patent is extended or adjusted under 35 U.S.C. 154(b) by 776 days.

(21) Appl. No.: 17/797,657

(22) PCT Filed: Feb. 11, 2021

(86) PCT No.: PCT/GB2021/050338
§ 371 (c)(1),
(2) Date: Aug. 4, 2022

(87) PCT Pub. No.: WO2021/161029
PCT Pub. Date: Aug. 19, 2021

(65) Prior Publication Data
US 2023/0062046 A1  Mar. 2, 2023

(30) Foreign Application Priority Data

Feb. 14, 2020 (GB) ..................................... 2002075

(51) Int. Cl.
*A61M 5/20* (2006.01)
*A61M 5/32* (2006.01)

(52) U.S. Cl.
CPC ........ *A61M 5/2033* (2013.01); *A61M 5/3245* (2013.01); *A61M 5/326* (2013.01);
(Continued)

(58) Field of Classification Search
CPC .......... A61M 5/2033; A61M 2005/206; A61M 5/3257; A61M 5/326; A61M 5/20;
(Continued)

(56) References Cited

U.S. PATENT DOCUMENTS

2014/0148763 A1  5/2014  Karlsson et al.

FOREIGN PATENT DOCUMENTS

CA  2315146 A1  6/1999
CN  101568359 A  10/2009
(Continued)

OTHER PUBLICATIONS

English Translation of WO2008113198 (Year: 2008).*
International Search Report and Written Opinion for Int. App. No. PCT/GB2021/050338, mailed May 14, 2021.

*Primary Examiner* — Nilay J Shah
(74) *Attorney, Agent, or Firm* — McDonnell Boehnen Hulbert & Berghoff LLP

(57) ABSTRACT

An injection device has an outer housing that receives a syringe containing medicament, a movable stopper, and a needle. A plunger rod moves the stopper and a needle shield moves relative to the outer housing between a needle covering position and a needle exposing position, where the needle exposing position is axially rearward of the needle covering position. The needle shield is biased axially forwardly toward the needle covering position. A locking member is axially moveable in the outer housing from a first axial position to a second axial position in response to forward axial movement of the plunger rod. A locking sleeve is axially movable relative to the outer housing between a non-locking position and a locking position, the locking position being axially rearward of the non-locking position, in which axial movement of the locking sleeve is selectively limited by the locking member when in the second axial position.

16 Claims, 8 Drawing Sheets

(52) U.S. Cl.
CPC ... *A61M 5/3271* (2013.01); *A61M 2005/3247* (2013.01); *A61M 2005/3267* (2013.01); *A61M 2205/581* (2013.01); *A61M 2205/582* (2013.01)

(58) Field of Classification Search
CPC ...... A61M 2205/581; A61M 2205/582; A61M 5/3157; A61M 5/31568; A61M 5/31566; A61M 5/3267; A61M 5/3271
See application file for complete search history.

(56) References Cited

FOREIGN PATENT DOCUMENTS

| | | | | |
|---|---|---|---|---|
| CN | 105960254 A | 9/2016 | | |
| CN | 107073227 A | 8/2017 | | |
| CN | 108025148 A | 5/2018 | | |
| CN | 108136119 A | 6/2018 | | |
| CN | 110520176 A | 11/2019 | | |
| EP | 2902061 A1 | * 8/2015 | ............. | A61M 5/20 |
| EP | 2605814 B1 | 4/2018 | | |
| EP | 3349829 B1 | 7/2019 | | |
| GB | 2537638 A | 10/2016 | | |
| GB | 2542202 A | 3/2017 | | |
| WO | WO-2008113198 A1 | * 9/2008 | ......... | A61M 5/2033 |
| WO | 2012/022810 A2 | 2/2012 | | |
| WO | 2017/046556 A1 | 3/2017 | | |

\* cited by examiner

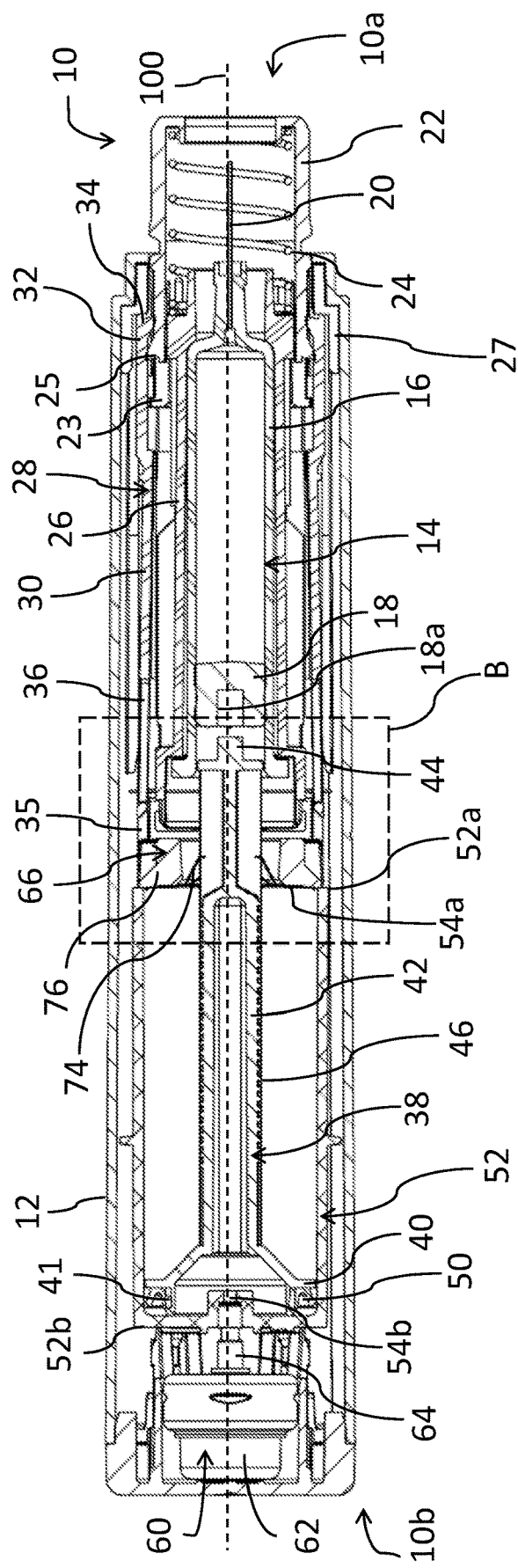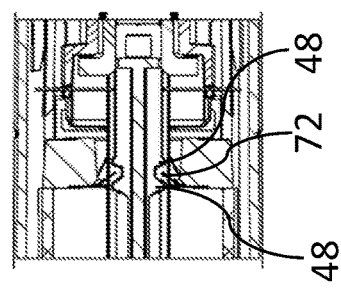
FIGURE 1A
FIGURE 1B

INJECTION DEVICE

CROSS REFERENCE TO RELATED APPLICATIONS

The present application is a U.S. National Phase Application pursuant to 35 U.S.C. § 371 of International Application No. PCT/GB2021/050338 filed Feb. 11, 2021, which claims priority to GB Patent Application No. 2002075.6 filed Feb. 14, 2020. The entire disclosure contents of these applications are herewith incorporated by reference into the present application.

TECHNICAL FIELD

This invention relates to an improved injection device, and, in particular, relates to an improved injection device that includes a moveable needle shield.

BACKGROUND

Automatic injection devices are known and many include means for covering the needle so as to reduce the risk of injury to the user. Such means include the use of a moveable needle shield that is moved to a needle-exposing position to permit penetration of the needle into an injection site and delivery of medicament, followed by movement of the needle shield to a needle-covering position, thereby rendering the needle safe. Often, the needle is "locked out" in the needle-covering position by way of mechanical interference with other components of the injection device.

In certain prior art devices, the initial action of moving the needle shield to the needle-exposing position is used to prime the lock-out mechanism that is subsequently used to lock the needle shield in the needle-covering position. Such priming gives rise to an audible sound that may be misinterpreted by the user as being indicative of a certain stage of medicament delivery (e.g. the beginning). However, in reality, such an audible indication occurs prior to any medicament being delivered and may even occur prior to the device being actuated. As such, a user might inadvertently remove the injection device from the injection site without having delivered the desired dose of medicament. Indeed, in some circumstances, no medicament may have been delivered at all.

WO2017046556 describes a known autoinjector device that includes a needle shield that is moveable relative to the needle.

It is an object of certain embodiments of the present invention to overcome certain disadvantages associated with the prior art.

SUMMARY

In accordance with an aspect of the present invention there is provided an injection device comprising:
  an outer housing configured to receive a syringe, the syringe having a barrel for containing medicament, a stopper that is axially moveable in the barrel, and a needle in fluid communication with the barrel;
  a plunger rod that is axially moveable within the outer housing and configured for axially moving the stopper of the syringe when received in the outer housing;
  a needle shield axially moveable relative to the outer housing between a needle covering position and a needle exposing position to selectively provide a needle enclosure, the needle exposing position being axially rearward of the needle covering position;
  a biasing means for biasing the needle shield axially forwardly toward the needle covering position;
  a locking member that is axially moveable in the outer housing from a first axial position to a second axial position in response to forward axial movement of the plunger rod;
  a locking sleeve that is axially movable relative to the outer housing between a non-locking position and a locking position, the locking position being axially rearward of the non-locking position, in which axial movement of the locking sleeve is selectively limited by the locking member when in the second axial position;
  wherein in a first configuration the needle shield is in the needle covering position and the locking sleeve is in the non-locking position so that at least a portion of the needle shield is axially slideable within the locking sleeve to permit rearward axial movement of the needle shield from the needle covering position to the needle exposing position; and
  in a subsequent configuration the needle shield is in the needle covering position and the locking sleeve is in the locking position so that the needle shield is prevented from moving axially rearwardly by interference with the locking sleeve.

In certain embodiments, the locking member may comprise one or more shunt arms that are engageable with the plunger rod such that forward axial movement of the plunger rod causes the locking member to move axially in the outer housing from the first axial position to the second axial position. The one or more shunt arms may be engageable with one or more second protrusions that extend radially from the plunger rod. In certain embodiments, the one or more shunt arms and/or the one or more second protrusions may flex radially when axial movement of the locking member is arrested in the second axial position, so as to permit forward axial movement of the plunger rod relative to the locking member.

The locking member may comprise one or more locking protrusions that are engageable with the locking sleeve when the locking sleeve is in its locking position, wherein engagement between the locking protrusions and the locking sleeve prevents forward axial movement of the locking sleeve relative to the locking member. The locking sleeve may comprise one or more rear legs each comprising a guiding portion and a hard stop, wherein each of the locking protrusions is engaged with the locking sleeve when the respective locking protrusion is disposed along the guiding portion. The one or more rear legs may be radially flexible and may be caused to flex radially outwardly by abutment with the one or more locking protrusions when the locking sleeve moves from the non-locking position to the locking position, so that each hard stop is disposed axially rearwardly of each of the locking protrusions.

The locking sleeve may be arranged to be moved from the non-locking position to the locking position by the action of the needle shield moving from the needle covering position to the needle exposing position. The locking sleeve may comprise one or more ledges, and the needle shield may abut the one or more ledges and cause the locking sleeve to move from the non-locking position to the locking position when the needle shield moves from the needle covering position to the needle exposing position.

In certain embodiments, the locking sleeve may comprise one or more forward legs and the needle shield may comprise one or more lockout feet, and one or both of the one or more forward legs and one or more lockout feet may flex radially to allow the other to pass axially when the locking sleeve is in the locking position and the needle shield is moving from the needle exposing position to the needle covering position, and wherein when the one or more lockout feet are axially forward of the one or more forward legs, abutment between the one or more lockout feet are axially forward of the one or more forward legs prevents the needle shield returning to the needle exposing position.

In certain embodiments, the injection device may comprise indicator means for producing an audible and/or tactile indication to indicate to a user of the injection device that medicament is being delivered to the injection site. The indicator means may comprise a series of first protrusions on the plunger rod and a sound-generating component that includes at least one sound-generating arm, wherein one of the series of first protrusions and the at least one sound-generating arm is more flexible than the other of the series of first protrusions and the at least one sound-generating arm, and wherein the plunger rod may move axially relative to the sound-generating component such that the at least one sound-generating arm may engage the series of first protrusions to produce a series of audible and/or tactile indications. The sound-generating component may be or form part of the locking member, wherein in the first position the sound-generating component is engageable with the plunger rod such that axial movement of the plunger rod causes axial movement of the sound-generating component relative to the barrel and moves the sound generating component to the second position, and in the second position the plunger rod may move axially relative to the sound-generating component such that the at least one sound-generating arm may engage the series of first protrusions to produce a series of audible and/or tactile indications.

In certain embodiments, the sound-generating component comprises an aperture through which the plunger rod extends.

In certain embodiments, the sound-generating component includes at least one shunt arm that is engageable with the plunger rod such that axial movement of the plunger rod causes axial movement of the sound-generating component relative to the barrel and moves the sound-generating component to the second position. The at least one shunt arm may engage with one of a series of second protrusions on the plunger rod.

In certain embodiments, the at least one shunt arm extends into the central aperture. In certain embodiments, the at least one sound-generating arm extends into the central aperture. The at least one shunt arm may extend to a position that is radially inwards of the radially outermost extreme of the at least one sound-generating arm.

In certain embodiments, each of the at least one sound-generating arms extends into the central aperture from between two shunt arms. In a particular embodiment the sound-generating component includes two pairs of shunt arms that each extend into the central aperture, and a pair of sound-generating arms that each extend from between the two shunt arms of each pair and also extend into the central aperture.

In certain embodiments, each of the at least one shunt arms extends to a position that is radially inwards of the radially outermost extreme of the second protrusions, and each of the at least one sound-generating arms extends to a position that is radially inwards of the radially outermost extreme of the first protrusions. In certain embodiments, in a pre-use configuration, ends of the at least one sound generating arms are disposed axially forwardly of the series of first protrusions, and ends of the at least one shunt arms are each disposed axially between a pair of second protrusions.

In accordance with another aspect of the present invention, there is provided an injection device comprising:
- a syringe having a barrel for containing medicament, a stopper that is axially moveable in the barrel;
- a plunger rod engageable with the stopper so that axial movement of the plunger rod causes axial movement of the stopper in the barrel, wherein the plunger rod comprises a series of first protrusions; and
- a sound-generating component comprising at least one sound-generating arm, wherein one of the series of first protrusions and the at least one sound-generating arm is more flexible than the other of the series of first protrusions and the at least one sound-generating arm, and the whole of the sound generating component is axially moveable relative to the barrel from a first position to a second position;
- wherein in the first position the sound-generating component is engageable with the plunger rod such that axial movement of the plunger rod causes axial movement of the sound-generating component relative to the barrel and moves the sound-generating component to the second position; and
- in the second position the plunger rod may move axially relative to the sound-generating component such that the at least one sound-generating arm may engage the series of first protrusions to produce a series of audible and/or tactile indications.

In certain embodiments, the sound-generating component comprises an aperture through which the plunger rod extends.

In certain embodiments, the sound-generating component includes at least one shunt arm that is engageable with the plunger rod such that axial movement of the plunger rod causes axial movement of the sound-generating component relative to the barrel and moves the sound-generating component to the second position. The at least one shunt arm may engage with one of a series of second protrusions on the plunger rod.

In certain embodiments, the at least one shunt arm extends into the central aperture. In certain embodiments, the at least one sound-generating arm extends into the central aperture. The at least one shunt arm may extend to a position that is radially inwards of the radially outermost extreme of the at least one sound-generating arm.

In certain embodiments, each of the at least one sound-generating arms extends into the central aperture from between two shunt arms. In a particular embodiment the sound-generating component includes two pairs of shunt arms that each extend into the central aperture, and a pair of sound-generating arms that each extend from between the two shunt arms of each pair and also extend into the central aperture.

In certain embodiments, each of the at least one shunt arms extends to a position that is radially inwards of the radially outermost extreme of the second protrusions, and each of the at least one sound-generating arms extends to a position that is radially inwards of the radially outermost extreme of the first protrusions. In certain embodiments, in a pre-use configuration, ends of the at least one sound generating arms are disposed axially forwardly of the series of first protrusions, and ends of the at least one shunt arms are each disposed axially between a pair of second protrusions.

BRIEF DESCRIPTION OF THE DRAWINGS

Embodiments of the invention are further described hereinafter with reference to the accompanying drawings, in which:

FIG. 1A is a cross-sectional view of an injection device in a pre-use configuration in accordance with an embodiment of the present invention;

FIG. 1B is a cross-sectional view of detail B of FIG. 1A in a plane parallel to but offset from the plane of the cross-section of FIG. 1A;

DETAILED DESCRIPTION

Figure 2:
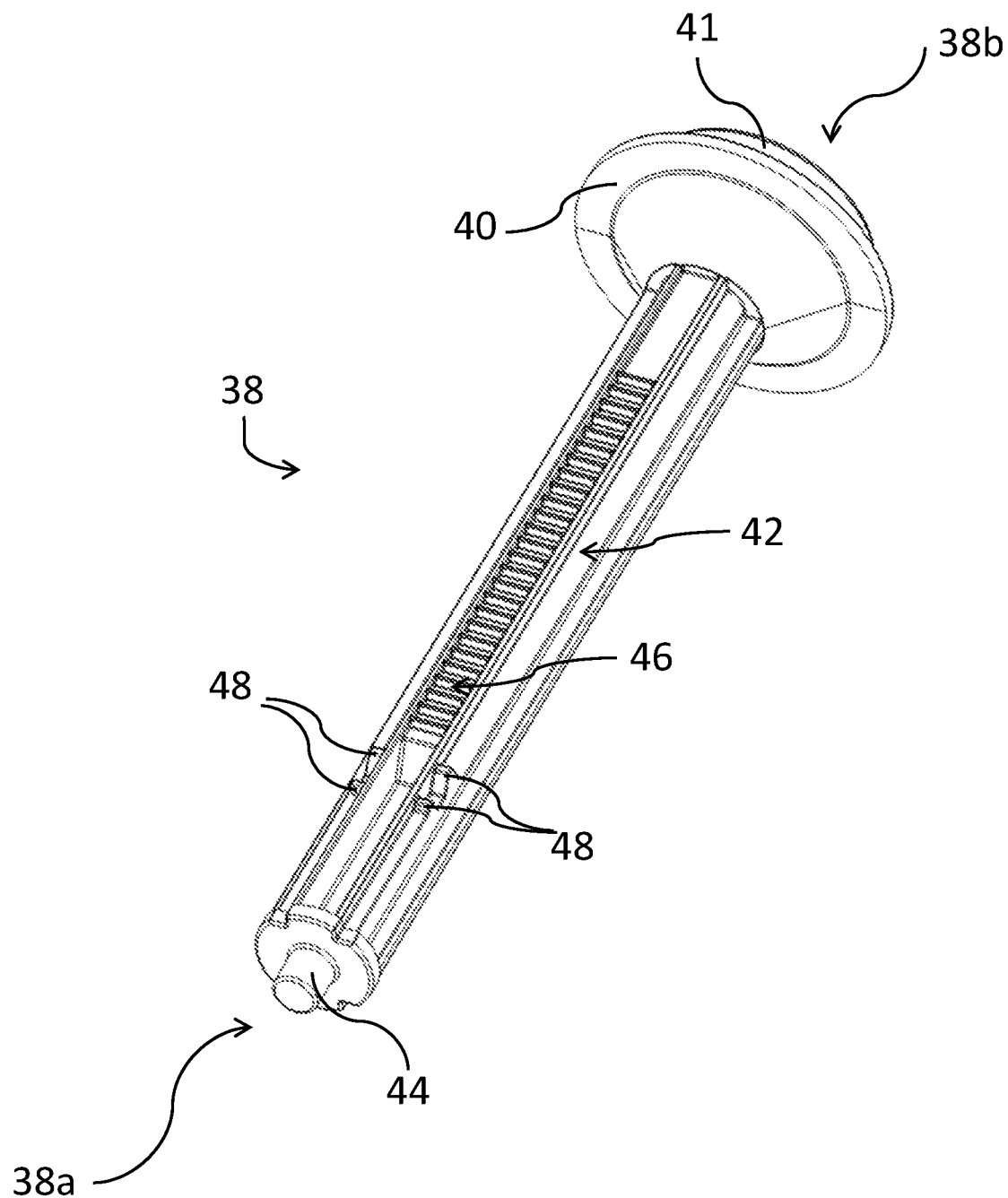
FIG. 2 is an isometric view of the plunger rod of the device of FIG. 1A.

An injection device 10 according to an embodiment of the present invention is shown in FIG. 1A. The injection device 10 provides a means for automatically delivering a dose of medicament, and may thus be termed an "autoinjector".

The injection device 10 extends generally along a longitudinal axis 100 between a front end 10a and a rear end 10b. Throughout the present specification, references to forward and axially forward directions and the like are considered to be directions that are parallel to the longitudinal axis 100 and directed towards the front end 10a. Similarly, references to rearward and axially rearward directions and the like are considered to be directions that are parallel to the longitudinal axis 100 and directed towards the rear end 10b. Radial directions are considered to be directions that are orthogonal to the longitudinal axis 100, wherein a radially outward position or point is further from the longitudinal axis 100 than a radially inward position or point. Circumferential directions are considered to be directions along an arc of a notional circle or cylinder centered on the longitudinal axis 100.

The injection device 10 comprises an outer housing 12, and within the outer housing 12 there is provided a syringe 14. The syringe 14 is supported within the outer housing 12 by a syringe holder 26. The syringe 14 includes a barrel 16 for containing medicament, a stopper 18 that is disposed in the barrel 16 and is axially moveable therein, and a needle 20. The medicament is to be contained in a volume defined in the barrel 16 between the stopper 18 and the needle 20, and the needle 20 is in fluid communication with such volume so as to permit delivery of the medicament through the needle 20 into an injection site.

During normal use of the injection device 10, the syringe 14 does not move relative to the outer housing 12 and is positioned relative to the outer housing 12 such that the needle 20 protrudes through an open end of the outer housing 12. However, the injection device 10 additionally includes a needle shield 22 that extends from the outer housing 12 and may selectively provide a needle enclosure. Specifically, and as is described in further detail below, the needle shield 22 is axially moveable relative to the outer housing 12 between a needle covering position and a needle exposing position. A biasing means 24 is provided that biases the needle shield 22 axially forwardly relative to the outer housing 12 toward the needle covering position. In the non-limiting embodiment shown in the Figures, the biasing means 24 comprises a spring, however the skilled reader will appreciate that any suitable biasing means that is capable of biasing the needle shield 22 axially forwardly relative to the outer housing 12 toward the needle covering position may be used in place of the illustrated spring. Additionally, the biasing means 24 should be capable of being compressed by a reasonable manual force (e.g. when the front end 10a of the injection device 10 is pressed against an injection site during use) so as to move the needle shield 22 axially rearwardly relative to the outer housing 12 to expose the needle 20. The needle shield 22 additionally includes a plurality of rear feet 23 and a plurality of lockout feet 25 disposed axially forward of the rear feet 23, all of which project radially outwardly in the non-limiting embodiment shown in the Figures. The lockout feet 23 each have a chamfered front surface.

Figure 3:
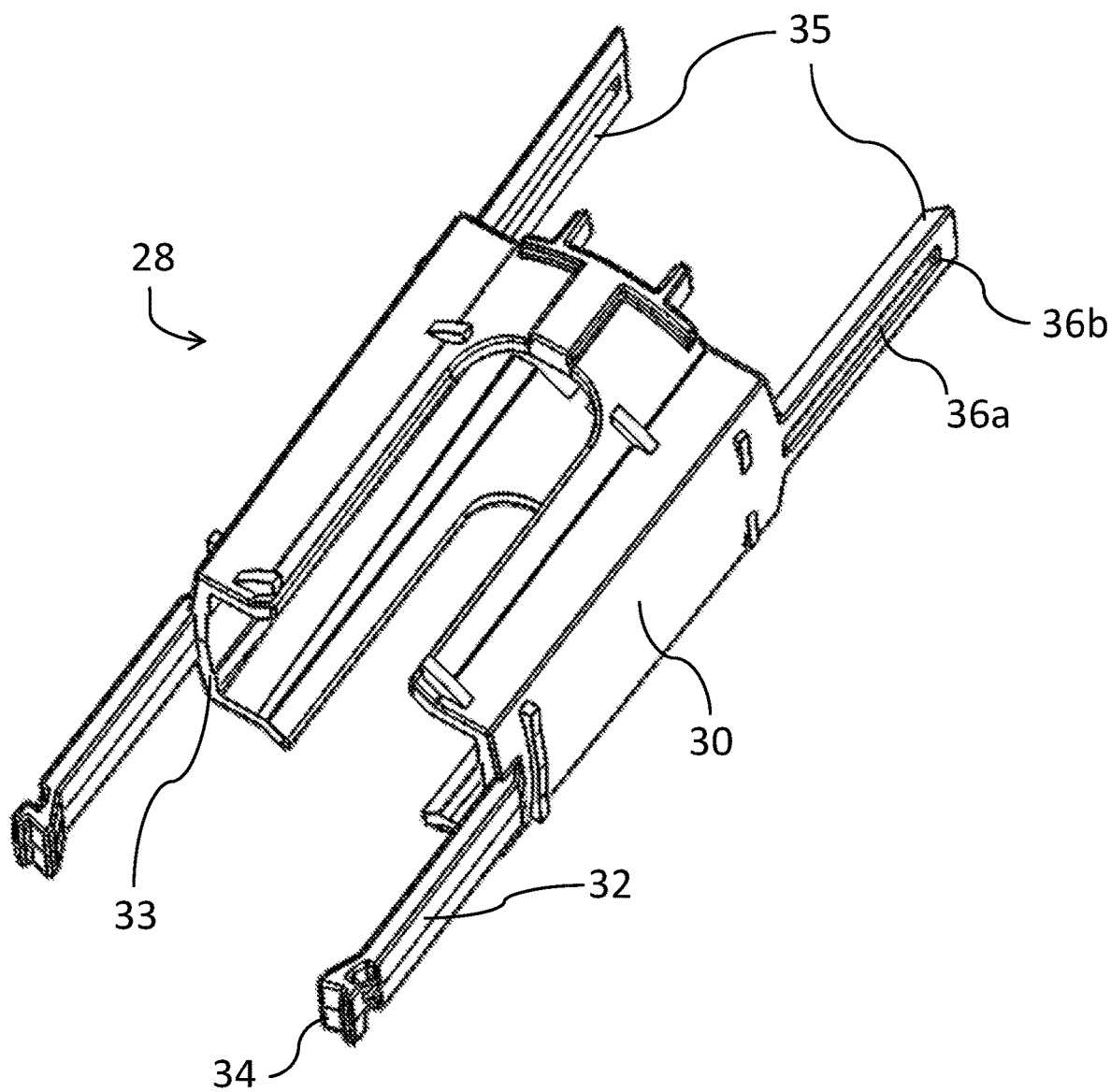
FIG. 3 is an isometric view of the locking sleeve of the device of FIG. 1A.

The injection device 10 includes a locking sleeve 28 that surrounds a portion of, and is radially outward of, the syringe holder 26. The locking sleeve 28 is shown in detail in FIG. 3 and includes a body 30, a pair of forward legs 32 extending forwardly from the body 30 where each forward leg terminates with a front foot 34, and a pair of rear legs 35 extending rearwardly from the body 30. The front feet 34 project radially inwardly in the non-limiting embodiment shown in the Figures and may have a chamfered rear-facing surface as shown in the Figures. Each of the rear legs 35 includes an axial guiding portion 36a terminated by a hard stop 36b. A front surface of the body 30 defines a pair of ledges 33 that extend radially inwardly from each of the forward legs 32. In the assembled pre-use configuration (or "first configuration") shown in FIG. 1A, a rear portion of the needle shield 22 is disposed radially inward of and axially rearward of a forward portion of the locking sleeve 28. In this configuration, the needle shield 22 is axially slidable relative to the locking sleeve 28. A front collar 27 disposed towards the front end 10a of the injection device 10 prevents the locking sleeve 28 flexing radially outward, thereby retaining the needle shield 22 in the slidable configuration within the locking sleeve 28.

Axially rearward of the stopper 18 there is provided a plunger rod 38 within the outer housing. The plunger rod 38 is shown in detail in FIG. 2 and comprises an elongate body 42 and a rear flange 40 at a rear end 38b of the plunger rod 38 extending radially from the elongate body 42. An axially extending wall 41 extends axially rearwardly from the rear flange 40 radially inward of an outer edge of the rear flange 40. As shown in FIG. 1A, a seal 50 (e.g. made of an elastomeric material) is retained on the plunger rod 38 between the rear flange 40 and the axially extending wall 41. In the embodiment shown in the Figures, the seal 50 has a nominal inner diameter that is less than the outer diameter of the axially extending wall 41 (which extends circumferentially). During assembly, the seal 50 is stretched over the axially extending wall such that elastic relaxation of the seal 50 around the axially extending wall 41 creates a snug fit of the seal 50 on the plunger rod 38. In alternative arrangements, the seal 50 may be otherwise affixed or retained on the plunger rod 38. The plunger rod 38 is arranged such that it is sealingly slidable within a drive chamber 52 that is disposed within the outer housing 12, wherein the seal 50 seals circumferentially against an inner surface of the drive chamber 52 while permitting axial movement of the seal 50 and the plunger rod 38 relative to the drive chamber 52.

The plunger rod 38 has a series of first protrusions 46 arranged along an axial direction on the elongate body 42, the function of which is described in further detail below. Whilst a single series of first protrusions 46 is visible in FIG. 2, the plunger rod 38 includes a further series of first protrusions on an opposing surface of the elongate body 42. In alternative embodiments, one or more series of first protrusions 46 may be arranged along respective axial directions on the elongate body 42. Each of the first protrusions 46 has at least a portion extending in a radial direction.

The plunger rod 38 additionally includes pairs of second protrusions 48 disposed on the elongate body 42. In the non-limiting embodiment shown in the Figures, the plunger rod 38 includes a first pair of second protrusions 48 and a second pair of second protrusions 48 disposed either side of the axial direction along which the series of first protrusions 46 is arranged. A similar arrangement is provided on the non-visible side of the elongate body 42, with reference to FIG. 2.

The plunger rod 38 includes a plug 44 arranged at its front end 38a, the plug 44 being configured for being received in a receiving socket 18a of the stopper 18. The plug 44 comprises an axially forwardly extending protrusion and the receiving socket 18a of the stopper 18 comprises a recess capable of receiving the plug 44 so that an interference fit may be established between the plunger rod 38 and the stopper 18.

The drive chamber 52 has a front opening 54a at its front end 52a and a rear opening 54b at its rear end 52b. The front opening 54a is configured so as to permit axial passage of the plunger rod 38 therethrough. The rear opening 54b is configured so as to permit the passage of a propellent therethrough so that propellant may enter a volume in the drive chamber 52 rearward of the plunger rod 38 such that the vapour pressure in such volume may increase to a magnitude that causes the plunger rod 38 to move axially forwardly in the drive chamber 52. The seal 50 substantially prevents propellant passing past the seal created between the seal 50 and the inner surface of the drive chamber 52, thereby allowing vapour pressure to increase as an increasing mass of propellant is added to the volume in the drive chamber 52 rear of the plunger rod 38

The injection device 10 includes a power source 60, which, in the non-limiting embodiment shown in the Figures, is a propellant source. The power source 60 may be user actuated to provide energy that causes the plunger rod 38 to move axially forwardly relative to the outer housing 12. In alternative embodiments, the power source may comprise any suitable means of providing the required energy, and may for example be a biasing member such as a spring. In embodiments where the power source 60 comprises a biasing means, certain features of the injection device 10 that are particularly suited to embodiments having a propellant source as the power source 60 may not be required. For example, in such embodiments, the seal 50 may not be required.

In the illustrated embodiment, the power source 60 (that is a propellant source) comprises a reservoir 62 for containing a volume of propellant and a stem 64 that is axially moveable relative to the reservoir 62. The stem 64 may be moved axially relative to the reservoir 62 between a sealing position in which propellant cannot exit from the reservoir 62 to an open position in which propellant may exit the reservoir 62 through a bore of the stem 64. The bore of the stem 64 is in fluid communication with the internal volume of the reservoir 62 when the stem 64 is in the open position and is not in fluid communication with the internal volume of the reservoir 62 when the stem 64 is in the sealing position.

The propellant contained in the reservoir 62 may be any suitable propellant capable of providing the necessary vapour pressure to cause axially forward movement of the plunger rod 38 in the drive chamber 52. In certain embodiments, the propellant may be a liquified gas. In certain non-exhaustive examples, the propellant may be one of or include a hydrofluoroalkane (HFA) or a hydrofluoroolefin (HFO). In certain non-exhaustive examples, the propellant may be one of or include any of HFA152a, HFA227ea, HFA134a, HFO1234ze, HFA507, or R32.

Figure 4:
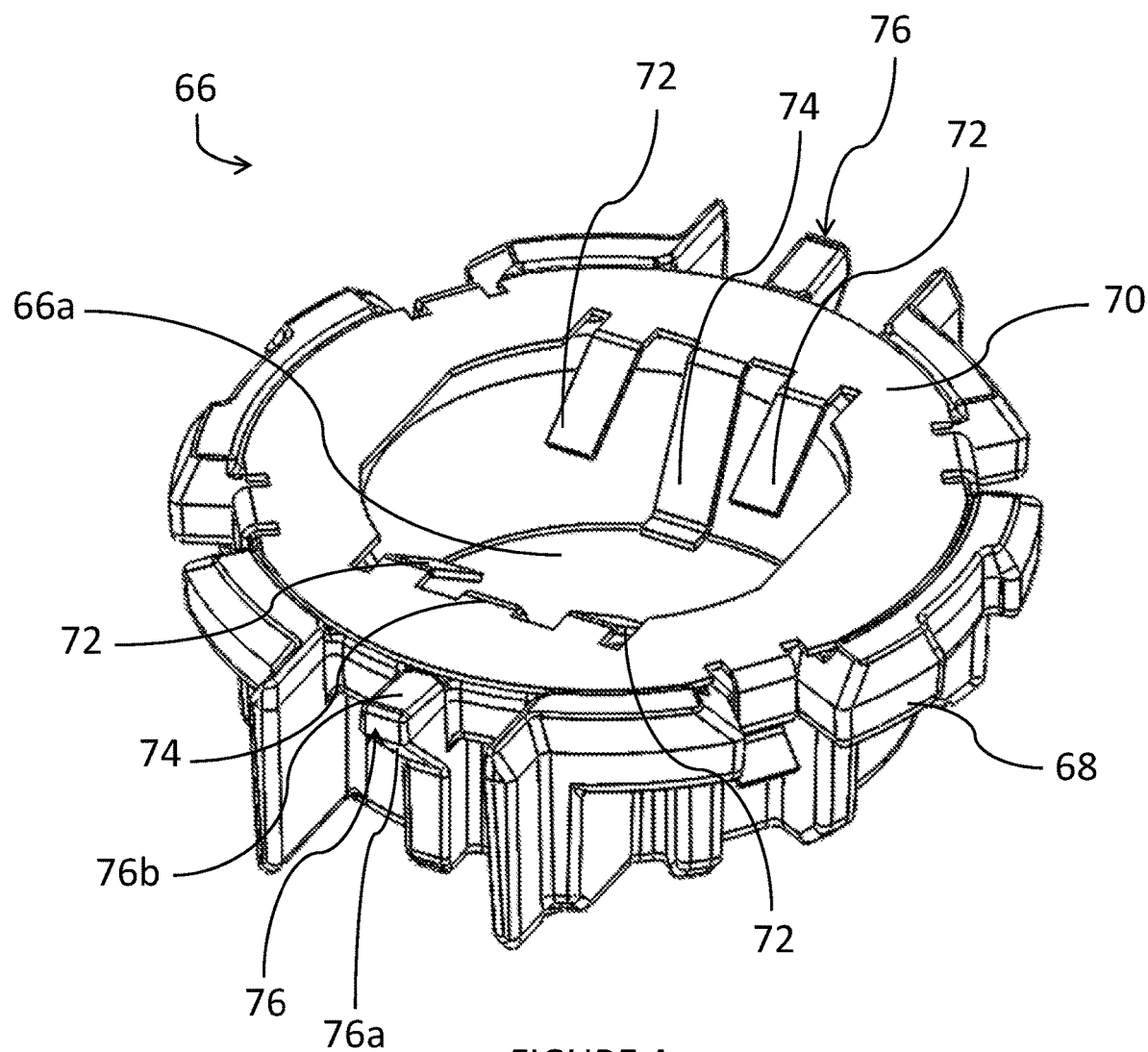
FIG. 4 is an isometric view of the locking member of the device of FIG. 1A.

Surrounding the elongate body 42 of the plunger rod 38 is a locking member 66, which is shown in more detail in FIG. 4. The locking member 66 is disposed axially forward of the drive chamber 52 and defines a central aperture 66a through which the plunger rod 38 extends. In the non-limiting embodiment of the Figures, the locking member 66 comprises a first component 68 and a second component 70 that is affixed (e.g. by push fit) to the first component 68. In alternative embodiments, the locking member 66 may comprise a single component, or may comprise more than two components. The locking member 66 (or at least the second component 70) may be considered to be a sound-generating component due to its ability to produce a series of audible and/or tactile indications during delivery (described in more detail below). In alternative embodiments, the sound-generating component may be provided separately from the locking member 66. In some embodiments a locking member 66 may be provided and no sound-generating component is present. In certain other embodiments, a sound-generating component may be provided and no locking member 66 is present.

The locking member 66 includes two pairs of shunt arms 72 that each extend into the central aperture 66a, and a pair of sound-generating arms 74 that each extend from between the two shunt arms 72 of each pair and also extend into the central aperture 66a. In the embodiment shown in the Figures, the shunt arms 72 and sound-generating arms 74 form part of the second component 70 of the locking member 66. In the assembled pre-use configuration shown in FIGS. 1A and 1B, each of the shunt arms 72 extends to a position that is radially inwards of the radially outermost extreme of the second protrusions 48, and each of the sound-generating arms 74 extends to a position that is radially inwards of the radially outermost extreme of the first protrusions 46. In the pre-use configuration shown in FIGS. 1A and 1B, ends of the sound generating arms 74 are disposed axially forwardly of the series of first protrusions 46, and ends of the shunt arms 72 are each disposed axially between a pair of second protrusions 48.

The locking member 66 additionally includes a pair of diametrically opposed locking protrusions 76, wherein each locking protrusion 76 projects radially outward. Each locking protrusion 76 has a front surface that is chamfered (relative to the longitudinal axis 100) and a rear surface that is substantially flat (i.e. that extends substantially perpendicularly to the longitudinal axis 100), when considering the locking member 66 in the assembled injection device 10 shown in FIG. 1A.

A method of operation of the injection device 10 is described below.

In the pre-use (or "first") configuration shown in FIG. 1A, the needle shield 22 is in the needle covering position, the plunger rod 38 is axially separate from the stopper 18 and the power source 60 is yet to be actuated.

Figure 5A:
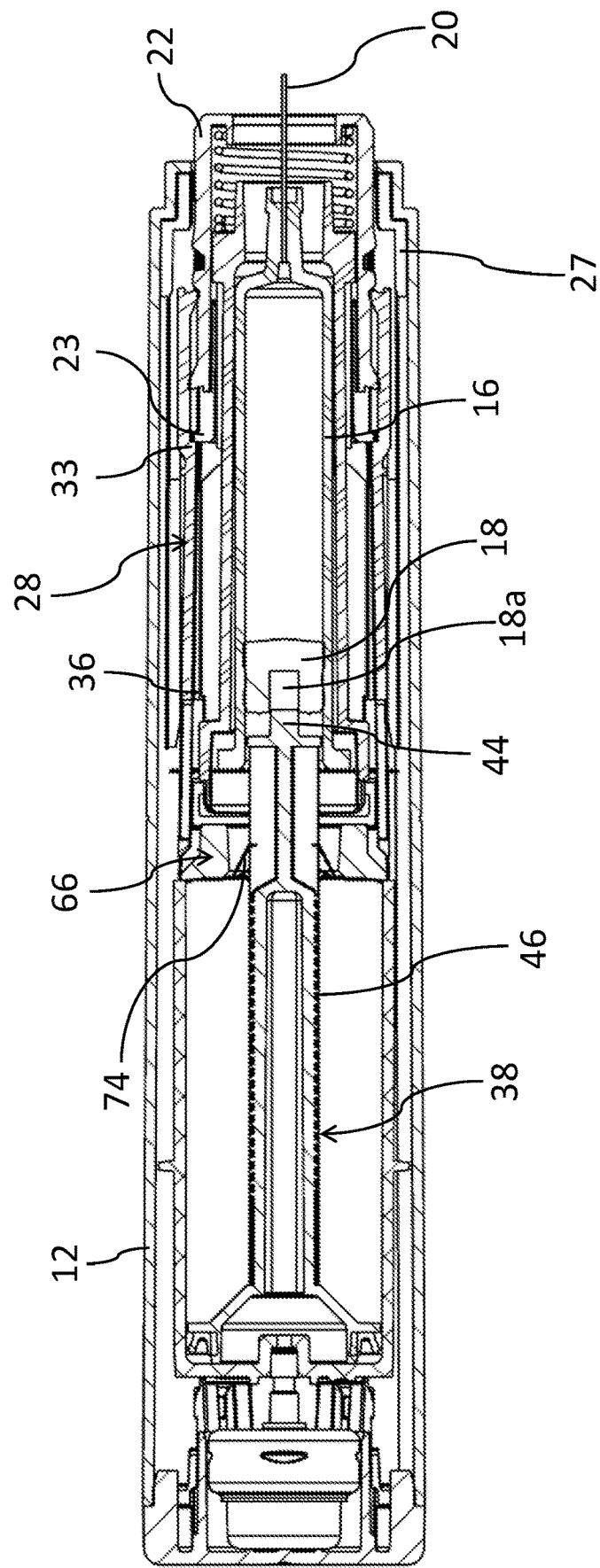
FIG. 5A is a cross-sectional view of the device of FIG. 1A in an insertion configuration.

When it is desired to deliver a dose of the medicament contained in the barrel 16, the front end 10a is placed against the desired injection site and a forwardly axial force is applied to the outer housing 12. This action causes the biasing means 24 to be compressed and the needle shield 22 to move rearwardly relative to the outer housing 12. The skilled reader will appreciate that relative to the injection site (against which the injection device 10 is being pressed) the needle shield 22 actually remains stationary and the outer housing (and other components contained therein) move axially forwardly relative to the needle shield 22, towards the injection site. FIG. 5A shows the injection device during an insertion configuration in which the needle 20 is exposed relative to the needle shield 22. In the configuration shown in FIG. 5A, the power source 60 is still yet to be actuated and so no medicament has been delivered to the injection site.

Figure 5B:
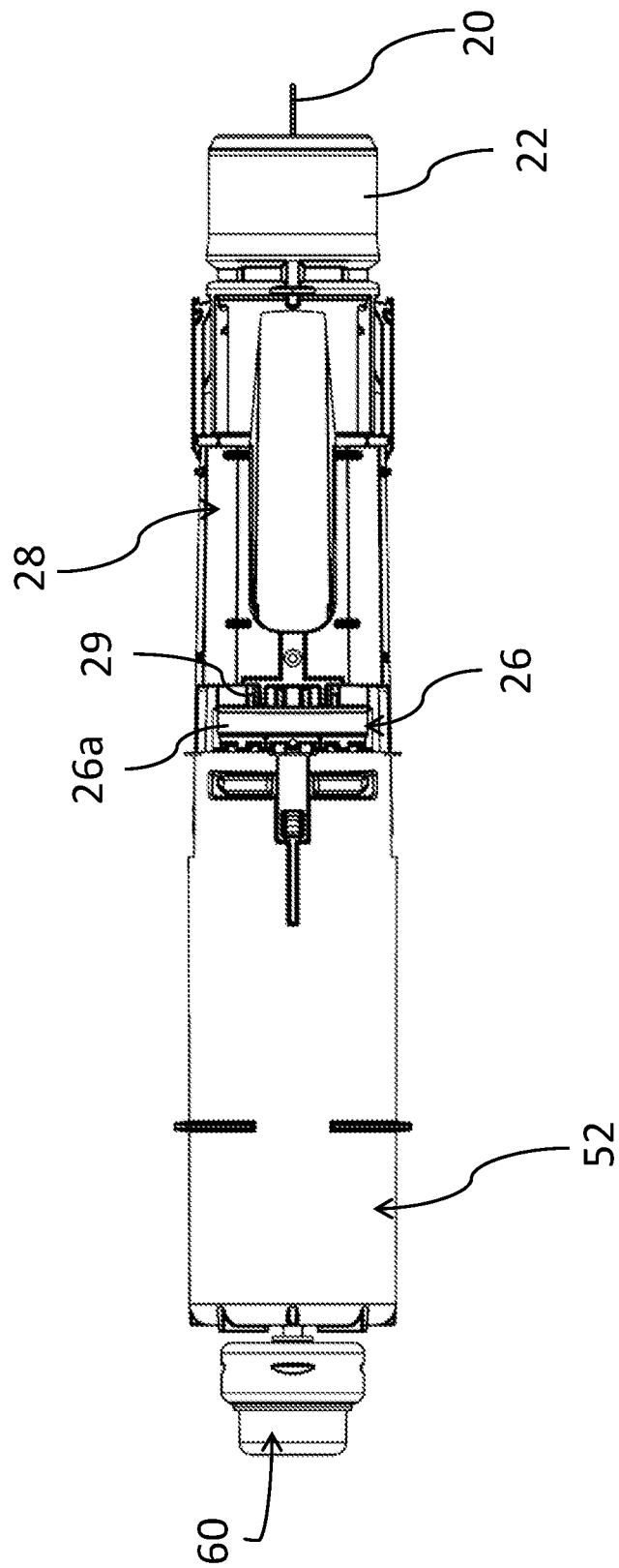
FIG. 5B shows the device of FIG. 1A with the outer housing removed.

As the needle shield 22 moves axially rearward relative to the outer housing 12, rear feet 23 of the needle shield 22 abut the ledges 33 (as shown in FIG. 5A) and cause the locking sleeve 28 to move axially rearwardly. As shown in FIG. 5B, the locking sleeve 28 includes a plurality of axially extending ribs 29 at its rear end, and the axially extending ribs 29 abut against a radially extending flange 26a on the syringe holder 26 such that axially rearward movement of the locking sleeve 28 is limited by the syringe holder 26.

Figure 6A:
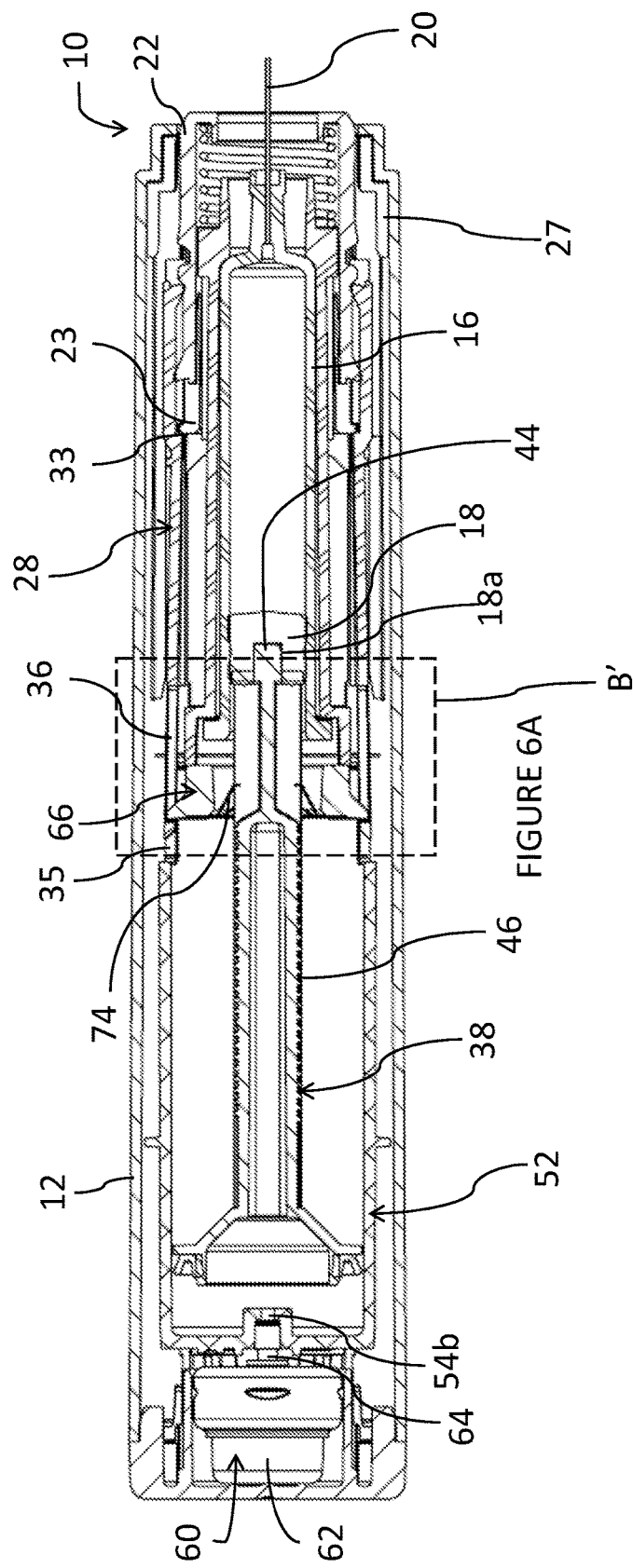
FIG. 6A is a cross-sectional view of the device of FIG. 1A in a delivery configuration.

Continued application of an axially forward force on the outer housing 12 towards the injection site causes the reservoir 62 of the power source 60 to move axially forwardly relative to the drive chamber 52. Because the stem 64 abuts against the drive chamber 52, the movement of the reservoir 62 relative to the drive chamber 52 causes the stem 64 to move axially rearwardly relative to the reservoir 62 from the sealing position to the open position. In the open position, propellant may exit the reservoir 62 through the bore of the stem 64 and into the drive chamber 52 via the rear opening 54b. The propellant provides a vapour pressure that acts on the plunger rod 38 and causes the plunger rod 38 to advance axially forwardly in the drive chamber 52. FIG. 6A shows the injection device 10 in a delivery configuration in which the plunger rod 38 has moved axially forwardly in the drive chamber 52 relative to the configuration shown in FIG. 5A.

Figure 6B:
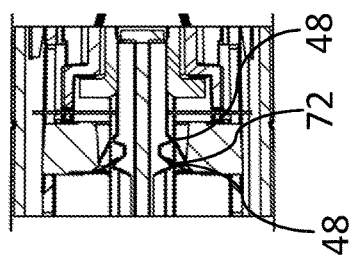
FIG. 6B is a cross-sectional view of detail B' of FIG. 6A in a plane parallel to but offset from the plane of the cross-section of FIG. 6A.

As the plunger rod 38 advances axially forwardly, the second protrusions 48 engage the shunt arms 72 (as shown in detail in FIG. 6B) and cause the locking member 66 to advance axially forwardly from its first axial position (as shown in FIGS. 1A and 5) to a second axial position (as shown in FIG. 6A). That is, forward axial movement of the plunger rod 38 causes movement of the locking member 66 from its first axial position to its second axial position. In doing so, the chamfered front surface 76a of each locking protrusion 76 contacts the rear legs 35 of the locking sleeve 28 and causes each rear leg 35 to deflect radially outwards until each is able to deflect radially inwardly once again to a configuration in which each hard stop 36b is disposed axially rearwardly of the locking protrusions 76 (in the illustrated embodiment, each locking protrusion 76 resides in one of the axial slots defined by the guiding portion 36a in this configuration). The locking member 66 may move axially forwardly until it contacts the syringe holder 26 (as shown in FIG. 6A) at which point the shunt arms 72 may deflect so as to permit the second protrusions 48 to pass and the plunger rod 38 to continue moving axially relative to the locking member 66.

The axial guiding portion 36a of the locking sleeve 28 may define a slot (as is the case for the illustrated embodiment) or the axial guiding portion 36a may define any alternative formation that may assist in preventing circumferential movement of the locking sleeve 28 relative to the locking member 66.

As the plunger rod 38 advances, it causes the stopper 18 to move axially forwardly in the barrel 16 and dispenses medicament out of the needle 20 and into the injection site.

During axially forward movement of the plunger rod 38 relative to the locking member 66, the sound-generating arms 74 repeatedly deflect and relax due to the passing series of first protrusions 46 on the plunger rod 38. This action causes the sound-generating arms 74 to repeatedly strike the plunger rod 38 as it advances and consequently produce an audible and/or tactile indication. This indicates to a user of the injection device 10 that medicament is being delivered to the injection site. The series of first protrusions 46 may be positioned relative to the sound-generating arms 74 such that audible and/or tactile indications are produced coincidentally with the commencement of medicament delivery. Additionally or alternatively, the initial distance between the plunger rod 38 and the stopper 18 may be determined to permit an initial "shunt" distance prior to commencement of medicament delivery and the production of audible and/or tactile indications.

In certain embodiments, the injection device 10 might not include any means for producing an audible and/or tactile indication to indicate to a user of the injection device 10 that medicament is being delivered to the injection site. In alternative embodiments, the injection device 10 may include alternative means (i.e. not the specific arrangement described above) to produce an audible and/or tactile indication to indicate to a user of the injection device 10 that medicament is being delivered to the injection site.

Medicament may continue to be delivered to the injection site until the stopper 18 reaches its forwardmost position in the barrel 16, the plunger rod 38 is otherwise arrested, or if the vapour pressure acting on the plunger rod 38 drops sufficiently (e.g. if the propellant in the drive chamber 52 was permitted to vent away). When delivery of medicament has ceased, there will be no further axial movement of the plunger rod 38 relative to the locking member 66. Consequently, no further audible and/or tactile indications are created by engagement between the sound-generating arms 74 and the series of first protrusions 46. Thus, the user may infer that delivery is complete and may remove the injection device 10 away from the injection site.

As the injection device 10 is removed from the injection site, the biasing means 24 causes the needle shield 22 to move axially forwardly relative to the outer housing 12. In practice, the biasing means 24 may cause the needle shield 22 to remain against the injection site whilst the outer housing 12 is moved away therefrom until such time when the needle shield 22 is in the needle covering position. Thus, the needle 20 may remain invisible to the user throughout.

Figure 7:
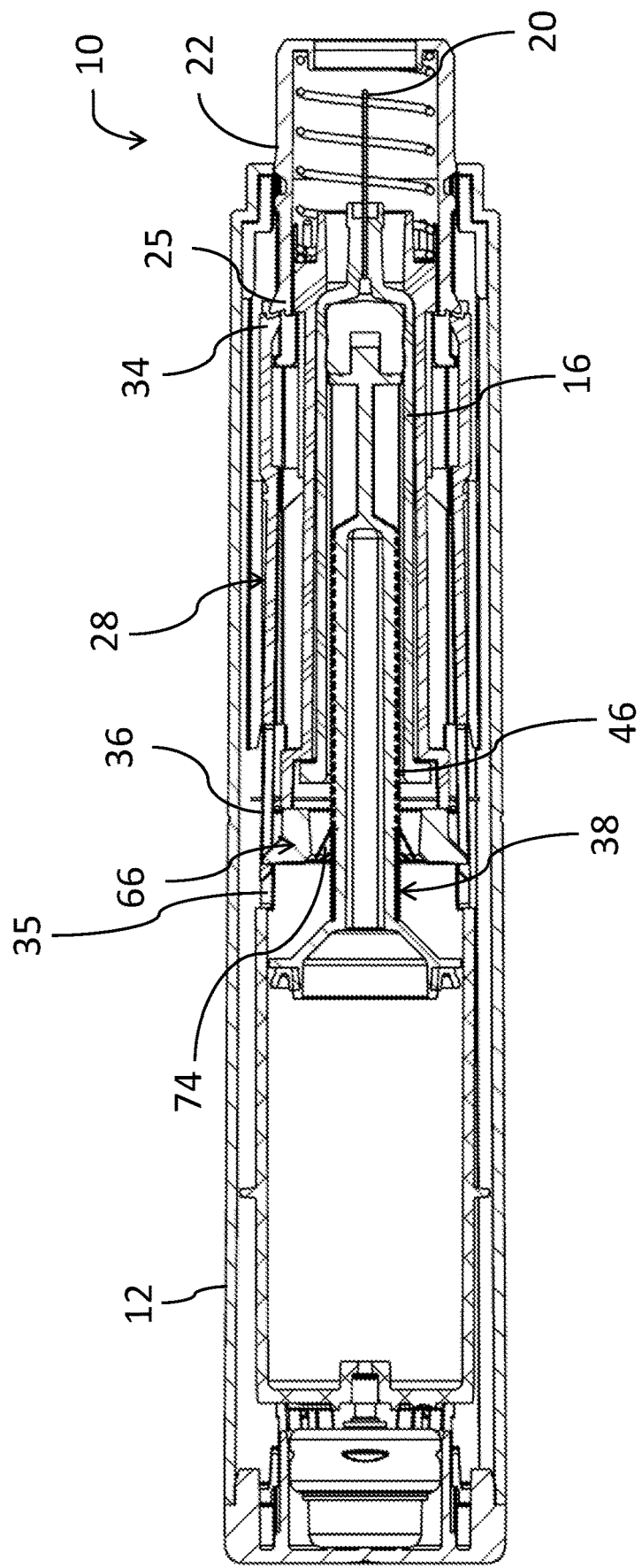
FIG. 7 is a cross-sectional view of the device of FIG. 1A in a post-delivery configuration.

In moving to the needle covering position, the needle shield 22 moves axially forwardly relative to the locking sleeve 28 which remains stationary (in a "locking position") due to engagement between the rear surfaces 76b of the locking protrusions and the hard stops 36b of the guiding portions 36a. That is, with the locking member 66 in its second axial position, the locking sleeve 28 is prevented from moving axially forwards. As such, the needle shield 22 advances relative to the locking sleeve 28 to the extent that the lockout feet 25 engage the front feet 34 of the locking sleeve 28. Consequently, there is radial deflection of the lockout feet 25 relative to the front feet 34 that permits the lockout feet 25 to axially pass the front feet 34, at which point any deflected ones of the lockout feet 25 and front feet 34 may return to their non-deflected configurations. Such deflection is possible at this stage since the locking sleeve 28 is axially rearward of the front collar 27 which, in the previous configuration shown in FIG. 1A, radially restrained the front feet 34. The extent by which the lockout feet 25 deflect radially inwardly and/or the front feet 34 deflect radially outwardly is dependent on the relative stiffnesses of the forward legs 32 and the needle shield 22, the nature of the degree of chamfering of the lockout feet 25 and the front feet 34, and the availability of surrounding space defined by neighbouring components. Embodiments of the invention may encompass any suitable configuration that permits axial passage of the lockout feet 25 past the front feet 34. In any embodiment, when the lockout feet 25 are axially forwards of the front feet 34, abutment therebetween prevents subsequent axially rearward movement of the needle shield 22 relative to the locking sleeve 28. In particular, the engaging surfaces of the lockout feet 25 and front feet 34 are such that axially opposing forces therebetween do not cause (or at least reduce the risk of) radial movement of either. Such a post-use configuration of the injection device 10 is shown in FIG. 7 in which the needle shield 22 is locked in the needle covering position and the locking sleeve 28 is in its locking position. Thus, the needle shield 22 prevents subsequent exposure of the needle 20 and the device may be handled safely.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An injection device comprising:
   an outer housing configured to receive a syringe, the syringe having a barrel for containing medicament, a stopper that is axially moveable in the barrel, and a needle in fluid communication with the barrel;
   a plunger rod that is axially moveable within the outer housing and configured for axially moving the stopper of the syringe when received in the outer housing;
   a needle shield axially moveable relative to the outer housing between a needle covering position and a needle exposing position to selectively provide a needle enclosure, the needle exposing position being axially rearward of the needle covering position;
   a biasing means for biasing the needle shield axially forwardly toward the needle covering position;
   a locking member that is axially moveable in the outer housing from a first axial position to a second axial position in response to forward axial movement of the plunger rod;
   a locking sleeve that is axially movable relative to the outer housing between a non-locking position and a locking position, the locking position being axially rearward of the non-locking position, in which axial movement of the locking sleeve is selectively limited by the locking member when in the second axial position;
   wherein the locking member comprises one or more locking protrusions that are engageable with the locking sleeve when the locking sleeve is in the locking position, wherein engagement between the locking protrusions and the locking sleeve prevents forward axial movement of the locking sleeve relative to the locking member;
   wherein in a first configuration the needle shield is in the needle covering position and the locking sleeve is in the non-locking position so that at least a portion of the needle shield is axially slideable within the locking sleeve to permit rearward axial movement of the needle shield from the needle covering position to the needle exposing position; and
   in a subsequent configuration the needle shield is in the needle covering position and the locking sleeve is in the locking position so that the needle shield is prevented from moving axially rearwardly by interference with the locking sleeve.

2. The injection device according to claim 1, wherein the locking member comprises one or more shunt arms that are engageable with the plunger rod such that forward axial movement of the plunger rod causes the locking member to move axially in the outer housing from the first axial position to the second axial position.

3. The injection device according to claim 2, wherein the one or more shunt arms are engageable with one or more second protrusions that extend radially from the plunger rod.

4. The injection device according to claim 3, wherein the one or more shunt arms and/or the one or more second protrusions may flex radially when axial movement of the locking member is arrested in the second axial position, so as to permit forward axial movement of the plunger rod relative to the locking member.

5. The injection device according to claim 1, wherein the locking sleeve comprises one or more rear legs each comprising a guiding portion and a hard stop, wherein each of the locking protrusions is engaged with the locking sleeve when the respective locking protrusion is disposed along the guiding portion.

6. The injection device according to claim 5, wherein the one or more rear legs are radially flexible and are caused to flex radially outwardly by abutment with the one or more locking protrusions when the locking sleeve moves from the non-locking position to the locking position, so that each hard stop is disposed axially rearwardly of each of the locking protrusions.

7. The injection device according to claim 1, wherein the locking sleeve is arranged to be moved from the non-locking position to the locking position by the action of the needle shield moving from the needle covering position to the needle exposing position.

8. The injection device according to claim 7, wherein the locking sleeve comprises one or more ledges, and the needle shield abuts the one or more ledges and causes the locking sleeve to move from the non-locking position to the locking position when the needle shield moves from the needle covering position to the needle exposing position.

9. The injection device according to claim 1, wherein the locking sleeve comprises one or more forward legs and the needle shield comprises one or more lockout feet, and one or both of the one or more forward legs and one or more lockout feet may flex radially to allow the other to pass axially when the locking sleeve is in the locking position and the needle shield is moving from the needle exposing position to the needle covering position, and wherein when the one or more lockout feet are axially forward of the one or more forward legs, abutment between the one or more lockout feet are axially forward of the one or more forward legs prevents the needle shield returning to the needle exposing position.

10. The injection device according to claim 1, comprising indicator means for producing an audible and/or tactile indication to indicate to a user of the injection device that medicament is being delivered to an injection site.

11. The injection device according to claim 10, wherein the indicator means comprises a series of first protrusions on the plunger rod and a sound-generating component that includes at least one sound-generating arm, wherein one of the series of first protrusions and the at least one sound-generating arm is more flexible than the other of the series of first protrusions and the at least one sound-generating arm, and wherein the plunger rod may move axially relative to the sound-generating component such that the at least one sound-generating arm may engage the series of first protrusions to produce a series of audible and/or tactile indications.

12. The injection device according to claim 11, wherein the sound-generating component is or forms part of the locking member, wherein in a first position the sound-generating component is engageable with the plunger rod such that axial movement of the plunger rod causes axial movement of the sound-generating component relative to the barrel and moves the sound-generating component to a second position, and in the second position the plunger rod may move axially relative to the sound-generating component such that the at least one sound-generating arm may engage the series of first protrusions to produce a series of audible and/or tactile indications.

13. An injection device comprising:
an outer housing;
a syringe;
a plunger rod;
a needle shield that moves relative to the outer housing between a needle covering position and a needle exposing position, where the needle exposing position is axially rearward of the needle covering position;
a spring engaged with the needle shield to bias the needle shield axially forwardly toward the needle covering position;
a shut arm engageable with the plunger rod and that moves within and relative to the outer housing from a first axial position to a second axial position when the plunger rod moves forward axially relative to the outer housing; and
a locking sleeve that moves between a non-locking position and a locking position, the locking position being axially rearward of the non-locking position, where axial movement of the locking sleeve is selectively limited when the locking member is in the second axial position;
wherein the locking sleeve moves from the non-locking position to the locking position when the needle shield moves from the needle covering position to the needle exposing position;
wherein the locking sleeve comprises a rear leg comprising a guiding portion and a hard stop and the shut arm comprises a locking protrusion that is engageable with the locking sleeve when the locking sleeve is in its locking position, where the locking protrusion is engaged with the locking sleeve when the locking protrusion is disposed along the guiding portion; and
wherein when the needle shield is in the needle covering position, the locking sleeve is in the non-locking position such that the needle shield is axially slidable within the locking sleeve which permits rearward axial movement of the needle shield from the needle covering position to the needle exposing position.

14. The injection device of claim 13, wherein when the needle shield is in the needle covering position, the locking sleeve is in the locking position such that the needle shield is prevented from moving axially rearwardly by engagement with the locking sleeve.

15. The injection device according to claim 13, wherein engagement between the locking protrusion and the locking sleeve prevents forward axial movement of the locking sleeve relative to the locking member.

16. The injection device according to claim 13, wherein the locking sleeve comprises a ledge abutting the needle shield to cause the locking sleeve to move from the non-locking position to the locking position when the needle shield moves from the needle covering position to the needle exposing position.

* * * * *